United States Patent
Van der Mee

(10) Patent No.: US 11,720,316 B2
(45) Date of Patent: *Aug. 8, 2023

(54) DIGITALLY CONTROLLED MICROPHONE WITH AUDIO COMPRESSOR

(71) Applicant: APOGEE ELECTRONICS CORPORATION, Santa Monica, CA (US)

(72) Inventor: Lucas Van der Mee, Los Angele, CA (US)

(73) Assignee: Apogee Electronics Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/062,627

(22) Filed: Oct. 4, 2020

(65) Prior Publication Data

US 2021/0019107 A1 Jan. 21, 2021

Related U.S. Application Data

(63) Continuation of application No. 16/559,607, filed on Sep. 3, 2019, now Pat. No. 10,838,683.
(Continued)

(51) Int. Cl.
*H04R 1/10* (2006.01)
*G06F 3/16* (2006.01)
(Continued)

(52) U.S. Cl.
CPC .............. *G06F 3/162* (2013.01); *G10L 19/00* (2013.01); *H04R 1/04* (2013.01); *H04R 1/08* (2013.01);
(Continued)

(58) Field of Classification Search
CPC .......... G06F 3/162; G10L 19/00; H04R 1/04; H04R 1/08; H04R 1/1041
See application file for complete search history.

(56) References Cited

U.S. PATENT DOCUMENTS 5,973,591 A * 10/1999 Schwartz ................. G08B 3/10
340/384.1
10,206,039 B1 * 2/2019 Yun .......................... G06F 3/162
(Continued)

FOREIGN PATENT DOCUMENTS

JP 2006332718 12/2006

OTHER PUBLICATIONS

Terrence O'Brien, "Hands-on with Blue Mics' Nessie: a USB mic that masks your flaws", Jan. 7, 2013, https://www.engadget.com/2013/01/07/hands-on-with-blue-mics-nessie/.
(Continued)

*Primary Examiner* — Simon King
(74) *Attorney, Agent, or Firm* — Larry E. Severin

(57) ABSTRACT

A digitally controlled microphone with audio compressor includes a capsule; a compressor circuitry having a compressor engine, a digitally controlled root mean square (RMS) detector and a digitally controlled analog processor; a bypass switch to the compressor circuitry; an analog to digital converter (ADC); a digital processor that sends digital audio to a host and receives a second digital audio signal; a digital to analog converter (DAC) and a summing circuit that combine the audio with the audio from the host and send it to a digitally-controlled headphone amplifier and a headphone jack; a microphone body; a serial host interface connector; and hardware controls on the microphone body.

5 Claims, 1 Drawing Sheet

Related U.S. Application Data

(60) Provisional application No. 62/793,841, filed on Jan. 17, 2019.

(51) Int. Cl.
   *H04R 1/04* (2006.01)
   *H04R 1/08* (2006.01)
   *G10L 19/00* (2013.01)
   *H04R 3/00* (2006.01)

(52) U.S. Cl.
   CPC ............ H04R 1/1041 (2013.01); H04R 3/00 (2013.01); H04R 2420/03 (2013.01)

(56) References Cited

U.S. PATENT DOCUMENTS

| | | | | |
|---|---|---|---|---|
| 2008/0037725 | A1* | 2/2008 | Berstis | H04L 63/10 379/88.13 |
| 2009/0003629 | A1* | 1/2009 | Shajaan | H04R 19/04 381/113 |
| 2009/0180653 | A1* | 7/2009 | Sjursen | H04R 25/60 381/322 |
| 2011/0243345 | A1* | 10/2011 | Carreras | G10L 21/0208 381/71.6 |
| 2012/0014547 | A1* | 1/2012 | Sjursen | H04R 25/602 381/323 |
| 2013/0219525 | A1* | 8/2013 | Soffer | G06F 3/162 726/34 |
| 2013/0271307 | A1* | 10/2013 | Kropfitsch | H03G 3/3005 341/158 |

OTHER PUBLICATIONS

"Aphex Microphone X", Jan. 30, 2013, https://www.sweetwater.com/store/detail/MicX-aphex-microphone-by.

* cited by examiner

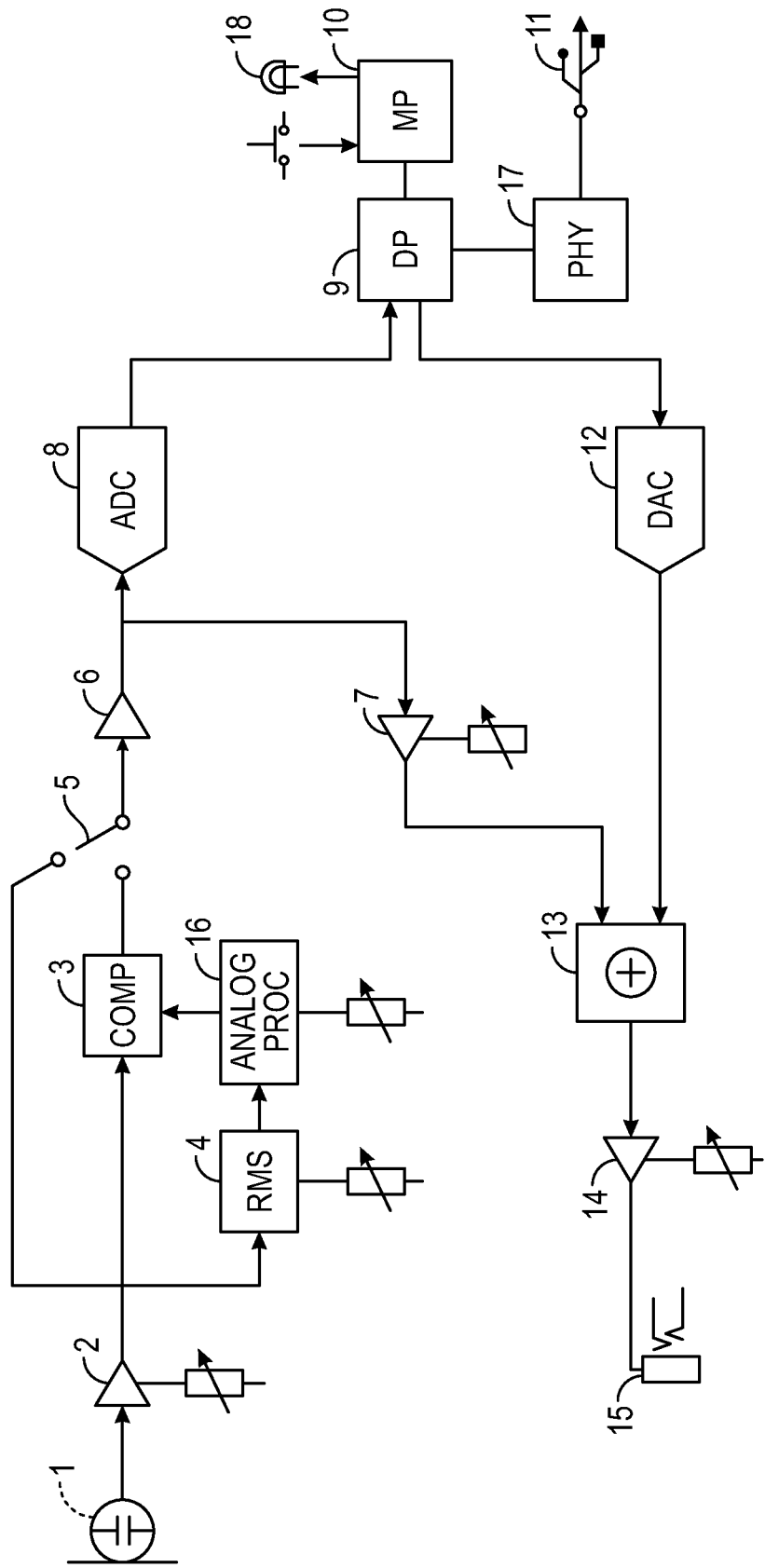

DIGITALLY CONTROLLED MICROPHONE WITH AUDIO COMPRESSOR

RELATED APPLICATIONS

This application claims the benefit of the filing date of U.S. Patent Application No. 62/793,841, filed Jan. 17, 2019, which is incorporated herein by reference in its entirety, and U.S. patent application Ser. No. 16/559,607, filed Sep. 3, 2019, which is incorporated herein by reference in its entirety

BACKGROUND OF THE INVENTION

The present invention generally relates to microphones and more specifically to a digitally controlled microphone with audio compressor.

High performance microphones require immediate pre-amplification of the signal generated by the microphone capsule. Preamplifier performance in one area is often compromised to achieve performance in another area. For example, the needs for immunity to input noise, large output signals capable of driving large capacitive loads, insensitivity to variations in supply voltages, low power requirements, and economic design can conflict. As a result, preamplifier designs often satisfy one requirement at the expense of not satisfying other requirements.

Audio compressor amplifiers are utilized to amplify voice and/or tones to provide an output having a predetermined constant level. Radio and television broadcasting stations use audio compression and peak limiting to avoid over-modulation. Audio analog to digital converters use audio compression to achieve a more optimized conversion by reducing dynamic range as well as to prevent over modulating the convert chip which has only a finite maximum input range.

Universal Serial Bus (USB) is a standard serial interface that connects an electronic device to a computer. USB supports many types of USB connectors such as USB-A and microUSB. The Lightning™ connector can be inserted either face-up or face-down, and can be used on one end of a cable while a USB connector or another Lightning connector is used on the opposite end.

It would be desirable to have a microphone that combines audio compression and digital control into a small handheld device.

SUMMARY OF THE INVENTION

In one aspect of the present invention, a microphone for digital communication of audio with a host, the device comprises an electrical circuitry that includes a capsule that converts sound waves into a first analog audio signal, a compressor circuitry that receives and compresses the first analog audio signal, a bypass switch that receives the first analog audio signal and allows for a bypass path to the compressor circuitry, thereby providing an optionally-compressed analog audio signal, an analog to digital converter (ADC) that converts the optionally-compressed analog audio signal into a first digital audio signal, and a digital processor that transmits the first digital audio signal to the host; a microphone body that encloses the electrical circuitry; and a host interface connector on the microphone body that provides a physical communication interface with the host.

In another aspect of the present invention, the microphone further includes a headphone jack on the microphone body that provides an amplified audio signal to a user's headphone; wherein the digital processor receives a second digital audio signal from the host; and the electrical circuitry further includes a digital to analog converter (DAC) that receives the second digital audio signal from the digital processor and converts the second digital audio signal into a second analog audio signal, a summing circuit that receives the first analog audio signal and the second analog audio signal and outputs a combined analog audio signal, and a digitally controlled headphone jack amplifier that amplifies the combined analog audio signal and provides an amplified audio signal to the headphone jack.

In yet another aspect of the present invention, a microphone for digital communication of audio with a host comprises an electrical circuitry that includes a capsule that converts sound waves into a first analog audio signal; a compressor circuitry that receives and compresses the first analog audio signal, the compressor circuitry including a compressor engine which compresses the first analog audio signal, a digitally controlled root mean square (RMS) detector which outputs an RMS signal that is utilized by the compressor engine, and a digitally controlled analog processor that affects the RMS signal, a bypass switch that receives the first analog audio signal and allows for a bypass path to the compressor circuitry, thereby providing a optionally-compressed analog audio signal, an analog to digital converter (ADC) that converts the optionally-compressed analog audio signal into a first digital audio signal, a digital processor that transmits the first digital audio signal to the host and receives a second digital audio signal from the host, the digital processor including a microprocessor that manages communication of digital audio and control signals with the host and that adjusts a digitally-adjustable component of the electrical circuitry, a digital to analog converter (DAC) that receives the second digital audio signal from the digital processor and converts the second digital audio signal into a second analog audio signal, a summing circuit that receives the first analog audio signal and the second analog audio signal and outputs a combined analog audio signal, and a digitally controlled headphone jack amplifier that amplifies the combined analog audio signal and provides an amplified audio signal to the headphone jack; a microphone body that encloses the electrical circuitry; a host interface connector on the microphone body that supports a serial interface and provides a physical communication interface with the host; a hardware control on the microphone body that a user may use to adjust a parameter of the electrical circuitry; and a headphone jack on the microphone body that provides an amplified audio signal to a user's headphone.

BRIEF DESCRIPTION OF THE DRAWINGS

FIG. 1 is a schematic diagram of an embodiment of an electric circuitry for a digitally controlled microphone with audio compressor, according to the present invention.

DETAILED DESCRIPTION

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

An embodiment of the present invention generally provides a digitally controlled microphone with audio compressor for computer and smart phone.

Embodiments of the present invention may combine several modules that were split up into several units in the past. An embodiment may contain an audio capsule, a microphone preamplifier, an analog audio compressor, analog to digital converter, digital to analog converter, headphone amplifier, microprocessor and digital interface for Universal Serial Bus (USB) and Apple Lightning™. User adjustable controls may be of the digital controlled analog type and adjustments can be performed either through hardware controls on the device or through software controls in an application running on the connected host (such as a computer or smart phone). An embodiment may be entirely powered by a host and does not require additional external power supplies.

Embodiments may include electronic circuitry for analog processing, such as an audio compressor. Hand-held embodiments of the invention may be used for audio recording, such as voice over, singing and instrument recording. Embodiments may provide audio to a headphone jack that that combines the live audio being recorded by the microphone with audio provided by the host. Embodiments may simplify and speed up the process of audio recording by combining several elements of a recording studio into one device. Embodiments may combine miniaturized electrical components with high efficiency in power consumption into a small handheld device.

In an embodiment, the capsule and the electrical circuitry may be enclosed in a microphone body. The microphone may have a wind screen that allows sound to reach the capsule, and may have ports, controls, or connectors on the body. The body may be small enough so that the device can be easily held in the hand of a person or placed on a stand, and used as a microphone.

As depicted in FIG. 1, an embodiment of electrical circuitry for a microphone may include a capsule (1) that may convert sound waves into an electrical signal, which may be amplified by a digitally controlled preamplifier (2). The analog audio signal may be distributed to compressor circuitry and to a bypass switch (5) which allows for a bypass path to the compressor circuitry. The compressor circuitry may include a compressor engine (3) which compresses the audio signal and a root mean square (RMS) detector (4) which outputs a signal that is utilized by the compressor engine. In an embodiment, the sensitivity, make up and amplitude behavior/amplitude curve of the compressor engine may be voltage controlled by a digitally controlled analog processor (16) that affects the RMS output signal. Time constants affecting RMS detector behavior, such as attack and release time may be fixed, semi-automatic or digitally controlled.

Bypass switch (5) may pass the selected input to ADC drive circuitry (6), which may feed an analog signal to both digital converter (ADC) (8) and a digitally controlled preamplifier (7) for direct monitoring on headphone output. The output of ADC (8) is sent to a digital processor (9), which may be controlled by a microprocessor or MP (10). Digital processor (9) may send the audio signal and other data to a host, and receive a second digital audio signal, other data, and commands from the host with physical host interface (17) and a connector (11) using an interface protocol such as USB or Lightning™. Digital processor (9) may operate in a streaming mode, under control of microprocessor (10). Digital audio returning from the host is sent to a digital to analog converter (DAC) (12). An analog output of DAC (12) and the output of preamplifier (7) are fed into a summing circuit (13). The summing circuit (13) combines the compressed input audio signal with a second analog signal received from the host, and outputs the result to a digitally controlled headphone amplifier (14) which feeds a stereo headphone jack (15) for direct monitoring. Microprocessor 10 may send and receive control signals with several pushbuttons and LEDS 18 on the housing of the microphone.

Embodiments may include components with digital controls. The configurations for certain components may be predetermined, may be set by a host through the analog processor (16), or may be set by controls such as buttons and LEDs (18) on the microphone. An embodiment of the invention may have a number of preconfigured setups, such as three, which the user can quickly recall by clicking on controls on the unit. A software application for the host may give the user control of individual parameters. In an embodiment, the microprocessor may receive control signals from the host and then adjust parameters for the digitally controlled components.

An embodiment of a microphone may comprise: a capsule that converts sound waves into an electrical signal; a digitally controlled pre amplifier that amplifies the electric signal; a compressor engine having an audio input that receives the signal, and an RMS detector; a switch that allows for a bypass path to the compressor; an ADC driver circuitry that receives the signal; a driver having an output that feeds the signal to a digital converter; a microprocessor that controls the driver; and an interface to a bus of a host device.

I claim:

1. A microphone comprising:
   a capsule that converts sound waves into an analog audio signal;
   a compressor circuitry that receives and compresses the analog audio signal;
   a microphone body that encloses the compressor circuitry and capsule;
   an analog to digital converter (ADC) that converts the compressed analog audio signal into a compressed digital audio signal;
   an interface that outputs the compressed digital audio signal;
   a digital processor that receives a second digital audio signal;
   a digital to analog converter (DAC) that converts the second digital audio signal into a second analog audio signal; and
   a headphone jack on the microphone body that outputs the second analog audio signal.

2. A microphone comprising:
   a capsule that converts sound waves into an analog audio signal;
   a compressor circuitry that receives and compresses the analog audio signal;
   a microphone body that encloses the compressor circuitry and capsule;
   a bypass switch that receives the analog audio signal and allows for a bypass path to the compressor circuitry, thereby providing an optionally-compressed analog audio signal; and an interface that outputs the optionally compressed digital audio signal.

3. A microphone comprising:
a capsule that converts sound waves into an analog audio signal;
a compressor circuitry that receives and compresses the analog audio signal;
a microphone body that encloses the compressor circuitry and capsule;
a bypass switch that receives the analog audio signal and allows for a bypass path to the compressor circuitry, thereby providing an optionally-compressed analog audio signal;
an analog to digital converter (ADC) that converts the optionally-compressed analog audio signal into an optionally-compressed digital audio signal; and
an interface that outputs the optionally-compressed digital audio signal.

4. The microphone of claim 3, wherein the compressor circuitry further includes a digitally controlled analog processor that affects the RMS signal.

5. A microphone comprising:
a capsule that converts sound waves into an analog audio signal;
a compressor circuitry that receives and compresses the analog audio signal;
a microphone body that encloses the compressor circuitry and capsule;
a compressor engine which compresses the analog audio signal;
a digitally controlled root mean square (RMS) detector which outputs an RMS signal that is utilized by the compressor engine; and
an interface that outputs the compressed analog audio signal.

* * * * *